USOO9621629B2

(12) United States Patent
Ozawa

(10) Patent No.: US 9,621,629 B2
(45) Date of Patent: Apr. 11, 2017

(54) CONTENT DISTRIBUTION SYSTEM, CACHE SERVER, AND CONTENT DISTRIBUTION METHOD

(75) Inventor: Kazunori Ozawa, Tokyo (JP)

(73) Assignee: Rakuten, Inc., Tokyo (JP)

( * ) Notice: Subject to any disclaimer, the term of this patent is extended or adjusted under 35 U.S.C. 154(b) by 400 days.

(21) Appl. No.: 14/130,936

(22) PCT Filed: Jul. 4, 2012

(86) PCT No.: PCT/JP2012/067053
§ 371 (c)(1),
(2), (4) Date: Jan. 6, 2014

(87) PCT Pub. No.: WO2013/005761
PCT Pub. Date: Jan. 10, 2013

(65) Prior Publication Data
US 2014/0136645 A1    May 15, 2014

(30) Foreign Application Priority Data

Jul. 5, 2011   (JP) .................................. 2011-149191

(51) Int. Cl.
G06F 15/167     (2006.01)
H04L 29/08      (2006.01)
(Continued)

(52) U.S. Cl.
CPC .......... *H04L 67/06* (2013.01); *H04L 67/2847* (2013.01); *H04L 69/163* (2013.01); *H04W 4/18* (2013.01)

(58) Field of Classification Search
CPC ... H04L 67/06; H04L 67/2847; H04L 69/163; H04W 4/18
(Continued)

(56) References Cited

U.S. PATENT DOCUMENTS 6,243,761 B1    6/2001 Mogul et al.
6,823,479 B1    11/2004 McElhaney, Jr. et al.
(Continued)

FOREIGN PATENT DOCUMENTS

JP    2000-276425    10/2000
JP    2002-259333     9/2002
(Continued)

OTHER PUBLICATIONS

International Search Report PCT/JP2012/067053 dated Sep. 25, 2012, with English translation.
(Continued)

*Primary Examiner* — Liangche A Wang
*Assistant Examiner* — Kaylee Huang
(74) *Attorney, Agent, or Firm* — Sughrue Mion, PLLC

(57) ABSTRACT

A cache server, connected to a packet forwarding apparatus that forwards a packet to be sent and received between a user terminal and a distribution server that distributes content over the Internet, temporarily stores at least some of the content in a content temporary storage unit of the cache server, calculates a bit rate when sending content based on a TCP response signal or an ECN (Explicit Congestion Notification) signal received from the terminal, and reads a file or stream of content requested in a content request message received from the terminal, whose bit rate is not greater than the bit rate, from the content temporary storage unit or the distribution server, stores the read file or stream in a packet of a prescribed protocol, and sends the packet.

11 Claims, 11 Drawing Sheets

(51) Int. Cl.
  *H04W 4/18* (2009.01)
  *H04L 29/06* (2006.01)
(58) Field of Classification Search
  USPC .............................. 709/213, 201, 203, 217
  See application file for complete search history.

(56) References Cited

U.S. PATENT DOCUMENTS

| | | |
|---|---|---|
| 6,874,017 B1 | 3/2005 | Inoue et al. |
| 7,277,942 B2 | 10/2007 | Inoue et al. |
| 7,685,311 B2 | 3/2010 | Friedman et al. |
| 7,747,255 B2 | 6/2010 | Dacosta et al. |
| 8,060,606 B2 | 11/2011 | Friedman et al. |
| 2001/0044835 A1 | 11/2001 | Schober et al. |
| 2001/0044857 A1 | 11/2001 | Pham et al. |
| 2003/0110293 A1 | 6/2003 | Friedman et al. |
| 2004/0042432 A1* | 3/2004 | Riazi ............... H04W 88/16 370/338 |
| 2004/0043770 A1 | 3/2004 | Amit et al. |
| 2004/0098463 A1 | 5/2004 | Shen et al. |
| 2005/0041584 A1* | 2/2005 | Lau ................. H04L 41/0866 370/235 |
| 2005/0132049 A1 | 6/2005 | Inoue et al. |
| 2009/0044128 A1* | 2/2009 | Baumgarten ..... G06F 17/30905 715/738 |
| 2009/0254657 A1* | 10/2009 | Melnyk ................. H04L 47/10 709/224 |
| 2010/0121953 A1 | 5/2010 | Friedman et al. |
| 2011/0055882 A1* | 3/2011 | Ohya ................ H04N 21/23439 725/93 |
| 2012/0147958 A1* | 6/2012 | Ronca ............... H04N 19/00521 375/240.16 |
| 2012/0191804 A1* | 7/2012 | Wright ............. G06F 17/30902 709/217 |
| 2012/0210381 A1 | 8/2012 | Ozawa |

FOREIGN PATENT DOCUMENTS

| | | |
|---|---|---|
| JP | 2003-242018 | 8/2003 |
| JP | 2004-516693 | 6/2004 |
| JP | 2005-522098 | 7/2005 |
| JP | 2008-535098 | 8/2008 |
| JP | 2008533811 | 8/2008 |
| JP | 2009026170 | 2/2009 |
| JP | 2010-273298 | 12/2010 |
| WO | 2006098825 | 9/2006 |
| WO | 2006105158 | 10/2006 |
| WO | 2011049179 | 4/2011 |

OTHER PUBLICATIONS

Extended European search report, dated Feb. 27, 2015, in corresponding European Patent Application No. 12808166.8.
Japanese Office Action, dated Dec. 2, 2014, in corresponding Japanese Patent Application No. 2013-523031.

* cited by examiner

CONTENT DISTRIBUTION SYSTEM, CACHE SERVER, AND CONTENT DISTRIBUTION METHOD

FIELD

Cross-Reference to Related Applications

The present application claims priority from Japanese Patent Application No JP2011-149191 (filed on Jul. 5, 2011), the content of which is hereby incorporated in its entirety by reference into this specification. The present invention relates to a content distribution system, a cache server, and a content distribution method, and in particular, relates to a content distribution system, a cache server, and a content distribution method, wherein content, including video, still images, software, applications and the like, is cached in a mobile network to be distributed to various types of terminal (for example, mobile telephones, smart phones, PCs (personal computers), game consoles and the like).

BACKGROUND

With LTE (Long Term Evolution) or EPC (Evolved Packet Core), it is expected that mobile networks will handle higher speeds and increased volumes, and with this development it is expected that from now on, content distribution in which content is distributed to various types of terminal including mobile terminals via mobile networks will become common.

Patent Literature 1 (PTL1) discloses a cache server that estimates communication bandwidth for a client from timestamp information of packets exchanged between server and client, and extracts a cache entry according to a result of the estimation, to be provided to the client. Patent Literature 2 (PTL2) discloses a proxy server that converts image data from an Internet site to image data of multi-resolution representation.

PTL 1:
Japanese Patent Kokai Publication No. JP2003-242018A
PTL 2:
Japanese Patent Kohyo Publication No. JP2008-535098A

SUMMARY

The following analysis is given by the present inventors.

From now on, through 2013, it is expected that data traffic volume in mobile networks will increase by from 8 to 10 or more times the current volume, and the greater part of the volume increase will consist of video content. Furthermore, it is expected that with the enhanced performance of terminals accompanying the rapid popularization of smart phones, there will be an increase in size and volume of video content, and that content of large volume will be distributed with high vision resolution by mobile networks in the near future.

Meanwhile, when carrying out content distribution by a mobile network, various types of terminal are used: for example, conventional mobile telephones, smart phones, tablet terminals, PCs and the like are used. In a conventional configuration for distribution of Internet content, content requests from all terminals are communicated to distribution servers on the Internet via packet forwarding apparatuses, and the distribution servers distribute content via the packet forwarding apparatuses to all terminals.

However, with this type of configuration the following problems occur.

First, there is a problem in that bandwidth available in a mobile network, and in particular the bandwidth of wireless segments, fluctuates with time according to the number of accesses and the bandwidth necessary for each access, so that it is not possible to distribute OTT (Over The Top) content while following the fluctuations, without remodeling the terminal. At this time, in a case where access from terminals is concentrated on highly popular content, traffic accessing a distribution server is concentrated. As a result, there is a problem in that Internet and mobile network load increases suddenly at a local level, and congestion occurs particularly in the wireless segments of a mobile network. When congestion occurs, there is a problem in that delays and packet losses occur in the mobile network, images freeze on a terminal side, image quality deteriorates, speech is interrupted, and QoE (Quality of Experience) deteriorates.

Furthermore, there is a problem in that, while screen resolution differs according to terminal type, it is not possible to detect the screen resolution of the terminal on a network side and to distribute content that matches screen resolution.

Moreover, it is desired to solve these problems without remodeling terminals.

According to technology disclosed in Patent Literature 1 (PTL1), a method of specifically estimating the bandwidth of a mobile network from timestamp information of packets exchanged between server and client is not disclosed, and there is a problem in that it is not possible to distribute content at an appropriate bit rate.

Accordingly, there is a need in the art to enable distribution of content without deterioration in QoE for a user, in a case where the bandwidth of the mobile network fluctuates.

According to a first aspect of the present invention, there is provided a content distribution system, comprising a distribution server that distributes content over the Internet. The system further comprises, in a mobile network: a packet forwarding apparatus that forwards a packet to be sent and received between the distribution server and a user terminal; and a cache server connected to the packet forwarding apparatus. The cache server comprises: a content temporary storage unit that temporarily stores at least some of the content; a hit rate calculator that calculates a hit rate when content is sent, based on a TCP (Transmission Control Protocol) response signal or an ECN (Explicit Congestion Notification) signal received from the terminal; and a transmission unit that reads a file or stream of content requested in a content request message received from the terminal, whose bit rate is not greater than the bit rate, from the content temporary storage unit or the distribution server, stores the read file or the stream in a packet of a prescribed protocol, and sends the packet.

According to a second aspect of the present invention, there is provided a content distribution method, comprising: by a cache server connected to a packet forwarding apparatus that forwards a packet to be sent and received between a user terminal and a distribution server that distributes content over the Internet, temporarily storing at least some of the content in a content temporary storage unit of the cache server; calculating a bit rate when sending content based on a TCP (Transmission Control Protocol) response signal or an ECN (Explicit Congestion Notification) signal received from the terminal; and reading a file or stream of content requested in a content request message received from the terminal, whose bit rate is not greater than the bit rate, from the content temporary storage unit or the distribution server, storing the read file or stream in a packet of a prescribed protocol, and sending the packet.

According to a third aspect of the present invention, there is provided a program causing a computer, connected to a packet forwarding apparatus that forwards a packet to be sent and received between a user terminal and a distribution server that distributes content over the Internet, to execute: temporarily storing at least some of the content in its own content temporary storage unit; calculating a bit rate when sending content based on a TCP response signal or an ECN (Explicit Congestion Notification) signal received from the terminal; and reading a file or stream of content requested in a content request message received from the terminal, whose bite rate is not greater than the bit rate, from the content temporary storage unit or the distribution server, storing the read file or stream in a packet of a prescribed protocol, and sending the packet. It is to be noted that the program may be stored on a non-transitory computer-readable recording medium.

According to a fourth aspect of the present invention, there is provided a cache server connected to a packet forwarding apparatus that forwards a packet to be sent and received between a user terminal and a distribution server that distributes content over the Internet. The cache server comprises: a content temporary storage unit that temporarily stores at least some of the content; a bit rate calculator that calculates a bit rate when content is sent, based on a TCP (Transmission Control Protocol) response signal or an ECN (Explicit Congestion Notification) signal received from the terminal; and a transmission unit that reads a file or stream of content requested in a content request message received from the terminal, whose bit rate is not greater than the bit rate, from the content temporary storage unit or the distribution server, stores the read file or stream in a packet of a prescribed protocol, and sends the packet.

The present invention provides the following advantage, but not restricted thereto. According to the content distribution system, the cache server, and the content distribution method related to the present invention, it is possible to distribute content without deterioration in QoE for a user, even in a case where the bandwidth of a mobile network fluctuates.

PREFERRED MODES

Figure 1:
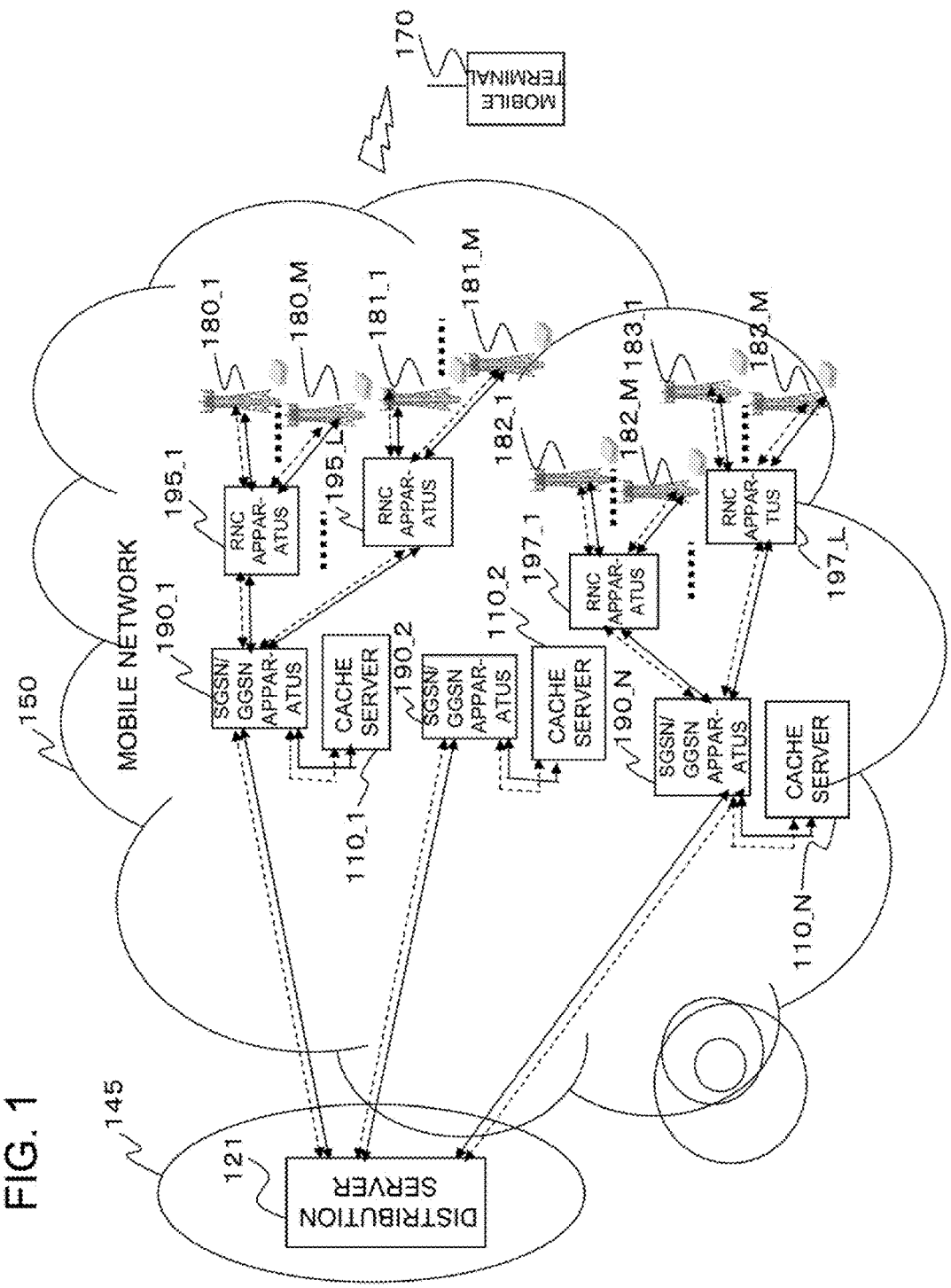
FIG. 1 is a block diagram illustrating an example of a connection configuration of a content distribution system according to a first exemplary embodiment.

In the present disclosure, there are various possible modes, which include the following, but not restricted thereto. First a description is given concerning an outline of the present invention. It is to be noted that reference symbols that refer to symbols in the drawings attached to this outline are examples solely in order to aid understanding and are not intended to limit the invention to modes shown in the drawings.

Figure 2:
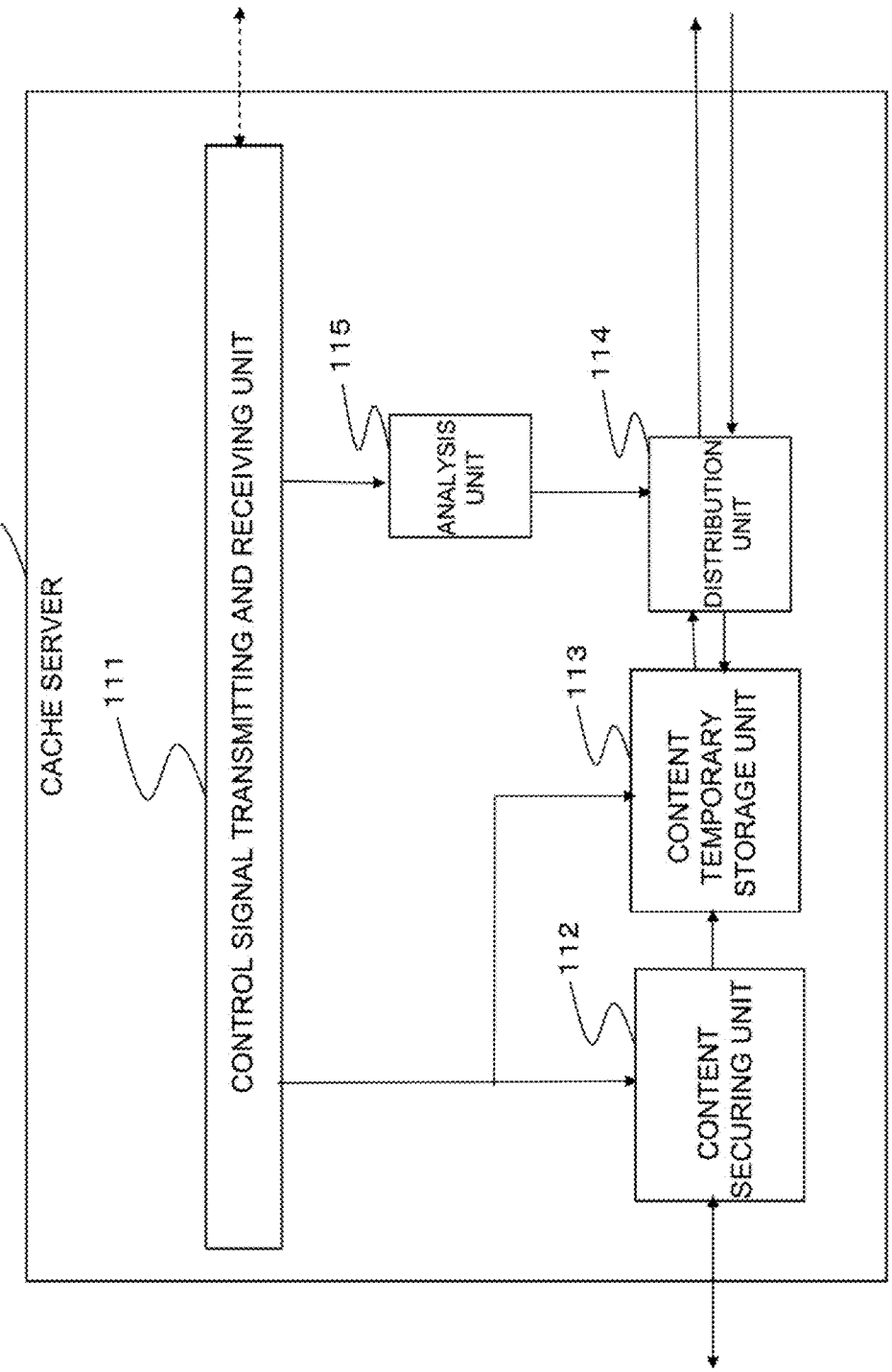
FIG. 2 is a block diagram illustrating an example of a configuration of a cache server of the content distribution system according to the first exemplary embodiment.
Figure 3:
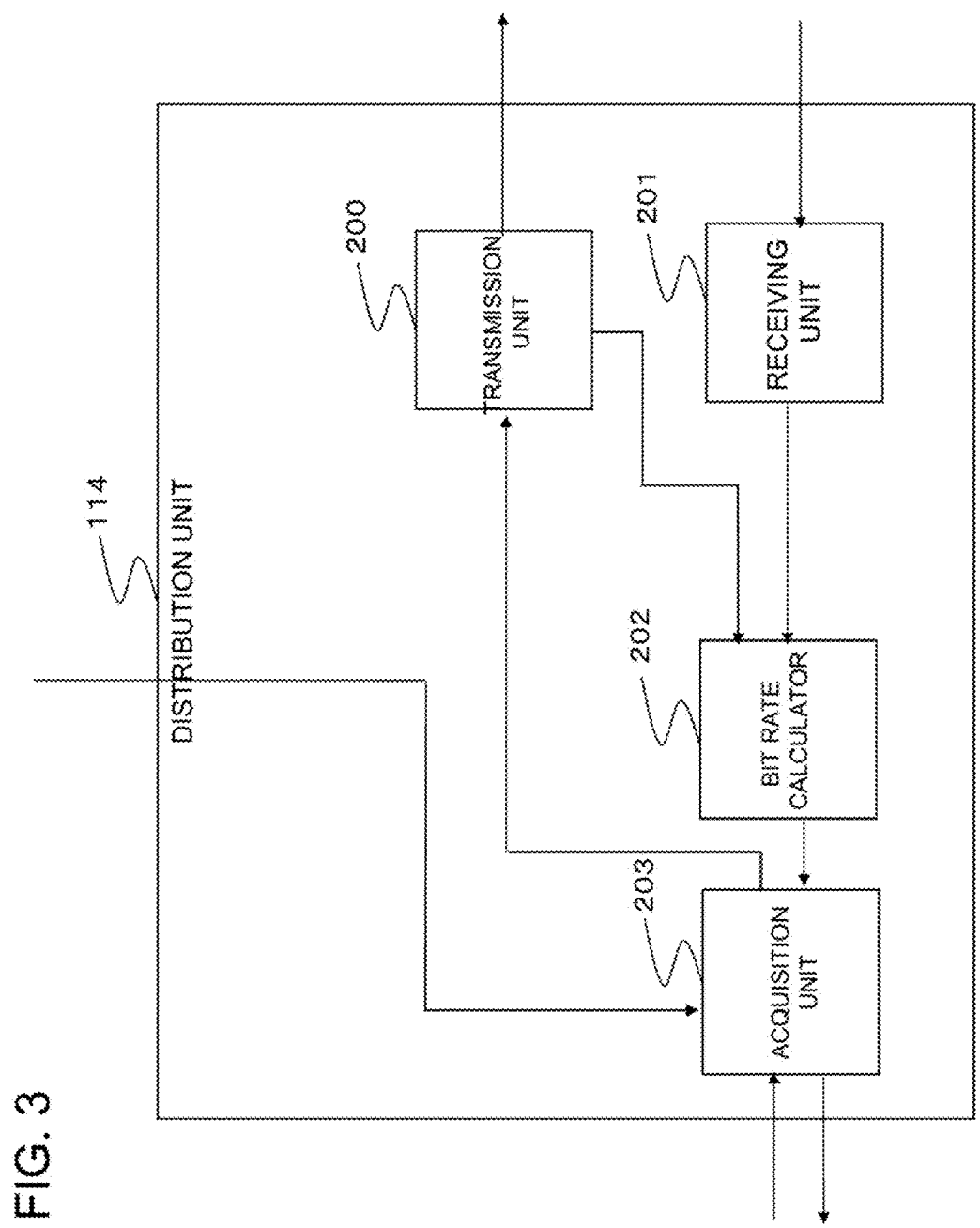
FIG. 3 is a block diagram illustrating an example of a configuration of a distribution unit in the cache server of the content distribution system according to the first exemplary embodiment.

Referring to FIG. 1 to FIG. 3, a content distribution system of the present invention is provided with a distribution server (121) that distributes content over the Internet, the system also being provided with, in a mobile network (150), a packet forwarding apparatus(s) (for example, an SGSN/GGSN apparatus 190_1) that forwards a packet to be sent and received between the distribution server (121) and a user terminal (for example, a mobile terminal 170), and a cache server (110_1) connected to the packet forwarding apparatus (190_1), wherein the cache server (110_1) is provided with a content temporary storage unit (113) that temporarily stores at least some of the content, a bit rate calculator (202) that calculates a bit rate when content is sent, based on a TCP response signal or an ECN (Explicit Congestion Notification) signal received from the terminal (170), and a transmission unit (200) that reads a file or stream of content requested in a content request message received from the terminal (170), whose bit rate is not greater than the bit rate, from the content temporary storage unit (113) or the distribution server (121), stores the read file or stream in a packet of a prescribed protocol, and sends the packet.

Figure 5:
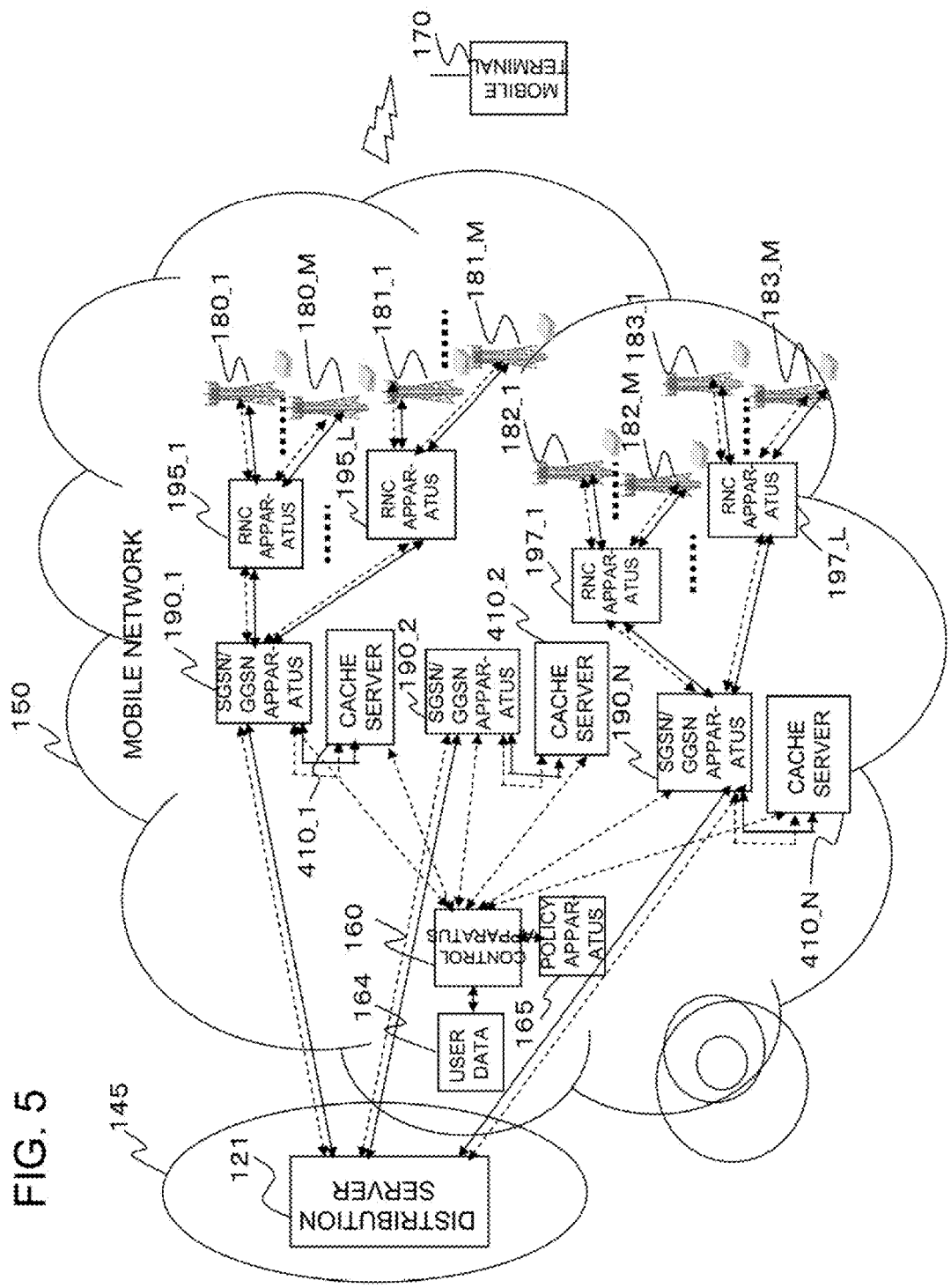
FIG. 5 is a block diagram illustrating an example of a connection configuration of the content distribution system according to a second exemplary embodiment.
Figure 7:
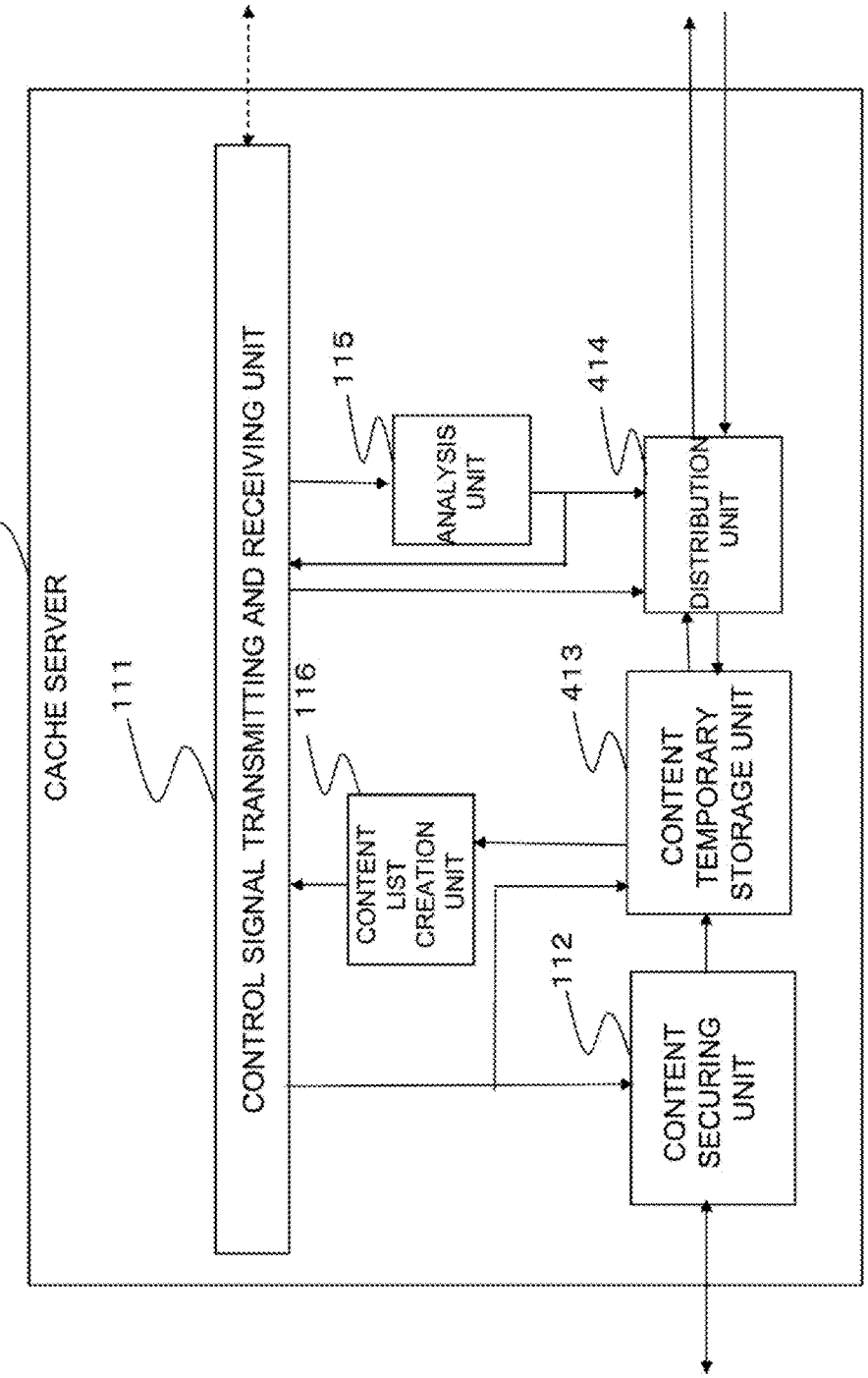
FIG. 7 is a block diagram illustrating an example of a configuration of a cache server in the content distribution system according to the second exemplary embodiment.
Figure 8:
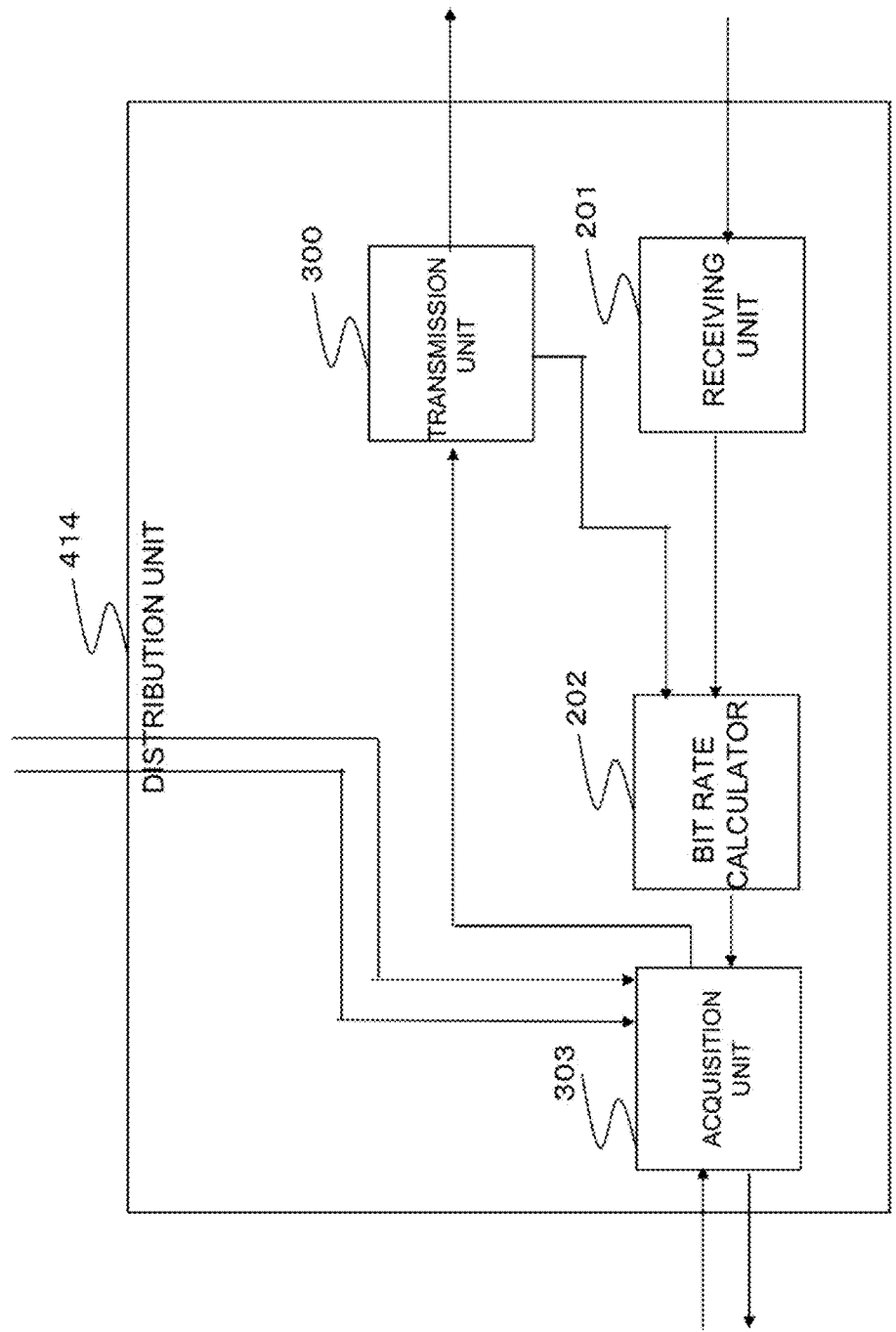
FIG. 8 is a block diagram illustrating an example of a configuration of a distribution unit in the cache server of the content distribution system according to the second exemplary embodiment.

Referring to FIG. 5, FIG. 7 and FIG. 8, the content distribution system may be provided with a control apparatus (160) that controls at least one of a plurality of cache servers (410_1 to 410_N), wherein: the control apparatus (160) may determine screen resolution of the terminal (170) based on information included, in a content request message from the terminal, select a cache server holding content of the relevant screen resolution from among the plurality of cache servers (410_1 to 410_N), and instruct the selected cache server to distribute the content, a transmission unit (300) may read a content file or stream requested in the content request message, having the screen resolution and a bit rate not greater than the bit rate, from a content temporary storage unit (413) or the distribution server (121), stores the read file or stream in a packet of a prescribed protocol, and sends the packet.

The bit rate calculator (202) may measure packet response time as the difference between the time at which a prescribed packet is transmitted from the transmission unit (200 or 300)

and the time at which a TCP response signal to the prescribed packet is received from the terminal (170), and calculate the bit rate based on the response time. The bit rate calculator (202) may have as the bit rate: a bit rate B calculated according to $B=(1-\alpha)\times Bc+\alpha\times\beta\times(Ta-T)$, where the response time is T, a prescribed target response time is Ta, a prescribed convergence factor is $\alpha$, a prescribed conversion factor by which time change is converted to bit rate is $\beta$, and a previous packet transmission bit rate is Bc. In addition, the bit rate calculator (202) may put the bit rate to zero or reduce it by a prescribed amount), when an ECN signal is received from the terminal (170).

The control apparatus (160) may extract a plurality of cache servers that store content of the abovementioned screen resolution from among the plurality of cache servers (410_1 to 410_N), and also may select a cache server from among the plurality of extracted cache servers in accordance with information concerning whether the terminal (170) is in a service area.

Figure 4:
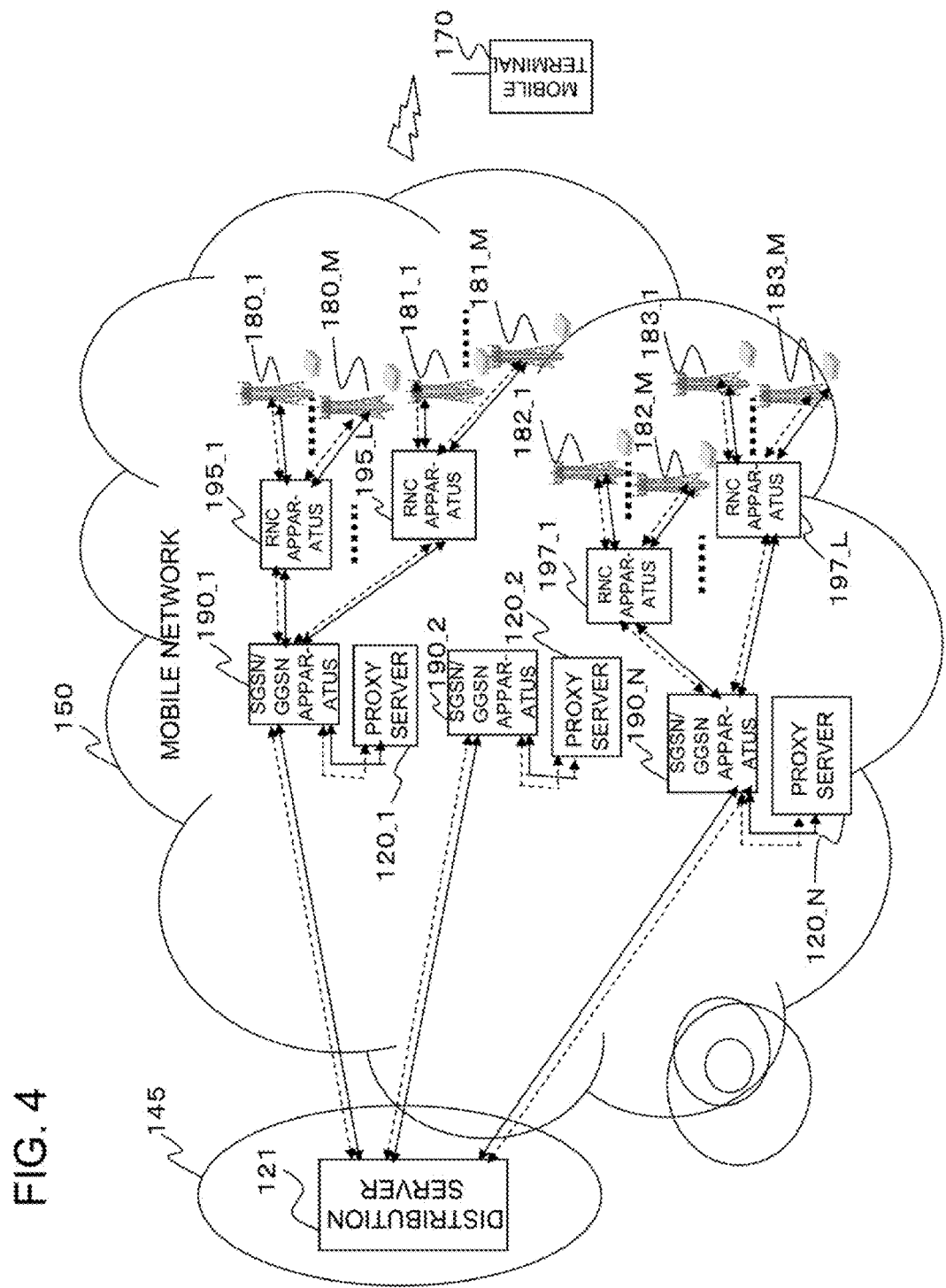
FIG. 4 is a block diagram illustrating an example of a connection configuration in a case of using proxy servers in the content distribution system according to the first exemplary embodiment.
Figure 9:
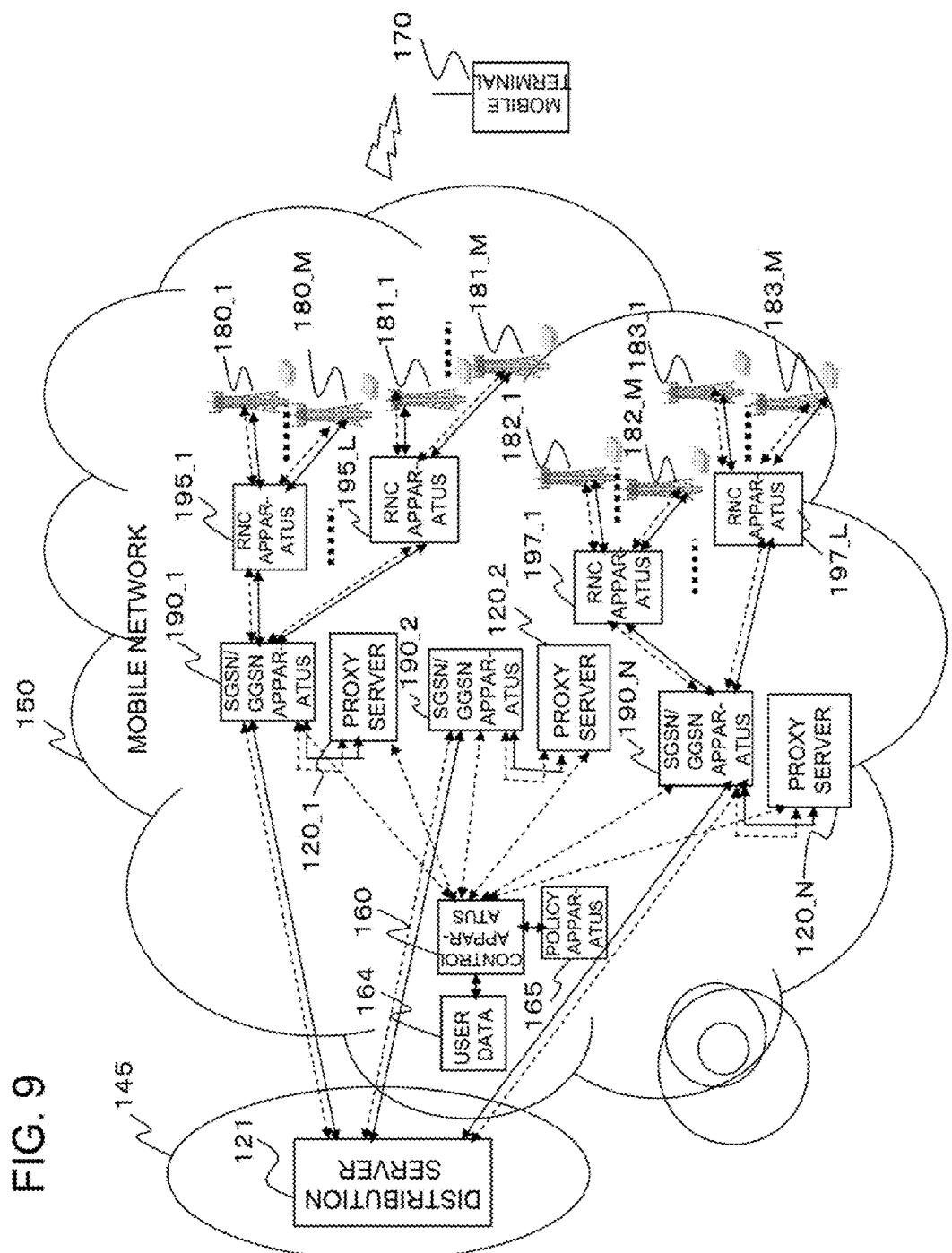
FIG. 9 is a diagram illustrating an example of a connection configuration in a case of using proxy servers in the content distribution system according to the second exemplary embodiment.

Referring to FIG. 4 and FIG. 9, each of the plurality of cache servers may be a transparent or a fully transparent proxy server (120_1 to 120_N).

Referring to FIG. 1, FIG. 4, FIG. 5, and FIG. 9 to FIG. 11, each of the packet forwarding apparatuses may be an SGSN (Serving General packet radio service Support Node) apparatus, a GGSN (Gateway General packet radio service Support Node) apparatus or an SGSN/GGSN apparatus, in a mobile packet network (150), or an S-GW (Serving Gateway) apparatus, a P-GW (Packet data network Gateway) apparatus or a S/P-GW apparatus in a mobile LTE/EPC network (250).

The following modes are possible in the present invention.

(Mode 1)

A content distribution system may be the content distribution system according to the first aspect.

(Mode 2)

The content distribution system may comprise: a control apparatus that controls at least one of a plurality of the cache servers. The control apparatus may determine screen resolution of the terminal based on information included in a content request message from the terminal, select a cache server holding content of the screen resolution from among the plurality of cache servers, and instruct the selected cache server to distribute the content. The transmission unit may read a file or stream of content requested in the content request message, having the screen resolution and a hit rate not greater than the bit rate, from the content temporary storage unit or the distribution server, store the read file or stream in a packet of a prescribed protocol, and send the packet.

(Mode 3)

The bit rate calculator may measure packet response time as difference between time at which a prescribed packet is transmitted from the transmission unit and time at which a TCP response signal to the prescribed packet is received from the terminal, and calculate the bit rate based on the response time.

(Mode 4)

The bit rate calculator may have as the bit rate: a bit rate B calculated according to $B=(1-\alpha)\times Bc+\alpha\times\beta\times(Ta-T)$, where the response time is T, a prescribed target response time is Ta, a prescribed convergence factor is $\alpha$, a prescribed conversion factor by which time change is converted to bit rate is $\beta$, and a previous packet transmission bit rate is Bc.

(Mode 5)

The bit rate calculator may reduce a bit rate by a prescribed amount, or put a bit rate to zero, when an ECN signal is received from the terminal.

(Mode 6)

The control apparatus may extract a plurality of cache servers that store content of the screen resolution from among the plurality of cache servers, and select a cache server from among the plurality of extracted cache servers in accordance with information concerning whether the terminal is in a service area.

(Mode 7)

The plurality of cache servers may be a transparent or a fully transparent proxy server.

(Mode 8)

The packet forwarding apparatuses may be a SGSN (Serving General packet radio service Support Node) apparatus, a GGSN (Gateway General packet radio service Support Node) apparatus or an SGSN/GGSN apparatus in a mobile packet network, or an S-GW (Serving Gateway) apparatus, a P-GW (Packet data network Gateway) apparatus or an S/P-GW apparatus in a mobile LTE (Long Term Evolution)/EPC (Evolved Packet Core) network.

(Mode 9)

The content may comprise at least one of video, still images, speech, audio, software, applications and data.

(Mode 10)

A content distribution method may be the content distribution method according to the second aspect.

(Mode 11)

The content distribution method may comprise: by a control apparatus that controls at least one of a plurality of the cache servers, determining screen resolution of the terminal, based on information included in a content request message from the terminal; by the control apparatus, selecting a cache server holding content of the screen resolution from among the plurality of cache servers, and instructing the selected cache server to distribute the content; and by a cache server that has received the instruction from the control apparatus among the plurality of cache servers, reading a file or stream of content requested in the content request message, having the screen resolution and a bit rate not greater than the bit rate, from the content temporary storage unit or the distribution server, storing the read file or stream in a packet of a prescribed protocol, and sending the packet.

(Mode 12)

The content distribution method may comprise: by a cache server that has received the instruction, measuring packet response time as difference between time at which a prescribed packet is transmitted from the transmission unit and time at which a TCP response signal to the prescribed packet is received from the terminal, and calculating the bit rate based on the response time.

(Mode 13)

In the content distribution method according, the cache server that has received the instruction may have as the bit rate: a bit rate B calculated according to $B=(1-\alpha)\times Bc+\alpha\times\beta\times(Ta-T)$, where the response time is T, a prescribed target response time is Ta, a prescribed convergence factor is a, a prescribed conversion factor by which time change is converted to bit rate is $\beta$ and a previous packet transmission bit rate is Bc.

(Mode 14)

The content distribution method may comprise: by the cache server that has received the instruction, reducing a bit rate by a prescribed amount, or putting a bit rate to zero, in a case of receiving an ECN signal from the terminal.

(Mode 15)

The content distribution method may comprise: by the control apparatus, extracting a plurality of cache servers that store content of the screen resolution from among the plurality of cache servers, and selecting a cache server from among the plurality of extracted cache servers in accordance with information concerning whether the terminal is in a service area.

(Mode 16)

In the content distribution method, the plurality of cache servers may be a transparent or a fully transparent proxy server.

First Exemplary Embodiment

Referring to FIG. 1 to FIG. 4, a detailed description is given concerning configuration and operation of a content distribution system according to a first exemplary embodiment.

It is to be noted that the exemplary embodiment below illustrates a configuration for a case where content is a video image, as an example, but it is possible to use a similar configuration also where the content includes still images, audio, speech, software, applications, data and the like.

FIG. 1 is a block diagram illustrating an example of a configuration of the content distribution system according to the present exemplary embodiment. FIG. 1 illustrates a configuration of a case where a 3G (3rd Generation) mobile packet network is used as a mobile network, and SGSN/GGSN apparatuses are used as packet forwarding apparatuses. FIG. 1 illustrates a configuration using cache servers.

In FIG. 1, a distribution server 121 on the Internet 145 stores various types of content over the Internet. In the following description such content is called OTT (Over The Top) content. The OTT (Over The Top) content may be a compressed encoded bit stream including at least one type among a video image, still images, audio, speech and the like, or a file containing a compressed encoded bit stream. It is to be noted that the OTT content may be a Web screen, software, an application, data or the like. A mobile terminal is used as a terminal. Note that a terminal outside of a mobile terminal can be used as the terminal.

N (N≥2) SGSN/GGSN apparatuses 190_1 to 190_N are disposed in the mobile network 150, RNC (Radio Network Controller) apparatuses 195_1 to 195_1 (L≥2) are connected to the SGSN/GGSN apparatus 190_1. Similarly, RNC apparatuses 197_1 to 197_L are connected to the SGSN/GGSN apparatus 190_N. L of the RNC apparatuses are connected to the SGSN/GGSN apparatus 190_2 but a description thereof is omitted in FIG. 1 due to space considerations. Furthermore, M (M≥2) base stations are connected to each RNC apparatus 1. For example, M base stations 180_1 to 180_M are connected to the RNC apparatus 195_1.

In FIG. 1, one cache server is connected to a GGSN functional unit of each SGSN/GGSN apparatus. For example, the cache server 110_1 is connected to the SGSN/GGSN apparatus 190_1. Here, the SGSN/GGSN apparatus means an apparatus configuration where an SGSN functional unit and a GGSN functional unit are arranged in the same place.

The mobile terminal 170 issues a connection request message for distribution, describing a URL (Uniform Resource Locator) of requested content. A base station (any base station 181_1 to 181_M in FIG. 1) in whose zone the mobile terminal 170 is present then receives the connection request message, and sends the connection request message to the RNC apparatus (RNC apparatus 195_L in FIG. 1) that controls the base station.

On receiving the connection request message from the base station, the RNC apparatus 195_L stores the connection request message, an IP (Internet Protocol) address of the distribution server 121, an IP address of the mobile terminal 170 and the like, in a payload part of a GTP (General packet radio service Tunneling Protocol) packet, and forwards the GTP packet to the SGSN/GGSN apparatus 190_1 for which the RNC apparatuses 195_1 to 195_L are arranged.

Next, the SGSN/GGSN apparatus 190_1 receives the GTP packet.

The cache server 110_1, for example, is connected to a Gi interface of the GGSN functional unit of the SGSN/GGSN apparatus 190_1. Similarly, the cache server 110_N is connected to a Gi interface of the GGSN functional unit of the SGSN/GGSN apparatus 190_N.

FIG. 2 is a block diagram illustrating an example of a configuration of the cache server 110_1. Here, a description is given concerning a configuration of the cache server 110_1 connected to the SGSN/GGSN apparatus 190_1, making reference to FIG. 2. It is to be noted that since the other cache servers 110_2 to 110_N have a configuration similar to the cache server 110_1, a description is given only concerning the configuration of the cache server 110_1.

Referring to FIG. 2, the cache server 110_1 is provided with a control signal transmitting and receiving unit 111, an analysis unit 115, a content securing unit 112, a content temporary storage unit 113 and a distribution unit 114.

In FIG. 2, the control signal transmitting and receiving unit 111 receives a connection request message from the mobile terminal 170, a reception IP address of the mobile terminal 170, the URL of the requested content and the like, from the SGSN/GGSN apparatus 190_1. The control signal transmitting and receiving unit 111 receives information concerning whether the mobile terminal 170 is in a service area from the SGSN/GGSN apparatus 190_1.

The analysis unit 115 reads what is contained in the connection request message stored in the payload part, with respect to a GTP packet, extracts information of the reception IP address of the mobile terminal 170, the URL of the requested content and the like, and outputs the URL of the requested content to the distribution unit 114.

The content securing unit 112 reads content from the distribution server 120 in advance, and outputs to the content temporary storage unit 113.

The content temporary storage unit 113 stores the content.

The distribution unit 114 receives URL information of the requested content from the analysis unit 115, searches the content temporary storage unit 113 regarding the requested content, and reads the relevant content. The distribution unit 114 generates packets of a protocol determined in advance (for example, TCP (Transmission Control Protocol)) with regard to the read content, to be sent to the SGSN/GGSN apparatus 190_1. The SGSN/GGSN apparatus 190_1 distributes packets including the content to the mobile terminal 170.

FIG. 3 is a block diagram illustrating an example of a configuration of the distribution unit 114. Referring to FIG. 3, a description is given concerning configuration and operation of the distribution unit 114. Referring to FIG. 3, the distribution unit 114 is provided, with a transmission unit 200, a receiving unit 201, a bit rate calculator 202 and an acquisition unit 203. The distribution unit 114 calculates the bit rate during content distribution, and distributes the content while switching to a file or stream of an appropriate bit rate.

The receiving unit 201 receives a response signal packet (for example, an Ack signal) from the mobile terminal 170 via the SGSN/GGSN apparatus 190_1, and outputs information of the response signal packet to the bit rate calculator 202. It is to be noted that in a case of receiving an ECN (Explicit Congestion Notification) notifying a congestion state, from the mobile terminal 170, the receiving unit 201 may instruct the bit rate calculator 202 to rapidly reduce the bit rate.

The bit rate calculator 202 receives information of transmitted packets received from the transmission unit 200 and information of response signal packets, and by using packet numbers included in this information to associate transmitted packets and response signal packets, measures response time T according to the following equation.

$$T = T\text{ack} - T\text{send} \quad (1)$$

In equation (1), Tack represents the time at which an N-th response signal packet is received by the receiving unit 201, and Tsend represents the time at which the N-th transmitted packet is transmitted by the transmission unit 200.

The bit rate calculator 202 sets the predetermined target time Ta, calculates differential delay time between Ta and T, and based on this, calculates transmission bit rate from equation (2).

$$B = (1-\alpha) \times Bc + \alpha \times \beta \times (Ta - T) \quad (2)$$

In equation (2), Bc is transmission bit rate of the N-th transmitted packet, received from the transmission unit 200 by the bit rate calculator 202. $\alpha$ is a factor to determine convergence time and is set to an appropriate value in advance. $\beta$ is a predetermined conversion factor for converting time change to bit rate. It is to be noted that the bit rate calculator 202 may perform calculation of equation (2) each predetermined time interval, or may do this when there is a request from the acquisition unit 203, for example.

The bit rate calculator 202 outputs the bit rate B calculated according to equation (2), for each predetermined time interval, to the acquisition unit 203. It is to be noted that the bit rate calculator 202 may output the bit rate B in response to a request from the acquisition unit 203.

As another configuration, in a case where an ECN (Explicit Congestion Notification) notification signal is inputted from the receiving unit 201, the bit rate calculator 202 may determine that the mobile network is in a congested state and may reduce the hit rate B by a predetermined amount, or may set B=0. Here, setting B=0 is a setting in which a packet is not transmitted from the transmission unit 200 in a predetermined time interval.

The acquisition unit 203 receives the URL of the requested content from the analysis unit 115 of FIG. 2, receives the bit rate B from the bit rate calculator 202, and with regard to the requested content, searches the content temporary storage unit 113 of FIG. 2 for a file of bit rate closest to B in a range that does not exceed the bit rate B, acquires the relevant file or stream, and outputs to the transmission unit 200. It is to be noted that in a case where the bit rate calculator 202 has a setting of B=0, the acquisition unit 203 does not acquire the content but sends a signal indicating that B=0 to the transmission unit 200.

The transmission unit 200 receives the file or stream of content requested by the mobile terminal 170 from the acquisition unit 203. The transmission unit 200 stores the received file or stream in a TCP packet, for example, to be sent to the SGSN/GGSN apparatus 190_1. The transmission unit 200 gives notification of information of a transmitted packet (for example, packet number, transmission time, transmission bit rate, size, etc.) to the bit rate calculator 202. It is to be noted that in a case where B=0, the transmission unit 200 stops packet transmission for a predetermined time interval.

In the present exemplary embodiment various types of modification are possible.

By connecting cache servers, content may be shared between the cache servers. For example, when the mobile terminal 170 is connected to the cache server 110_1, in a case where the requested content is not cached in the cache server 110_1, a control apparatus 160 may determine whether an adjacent cache server, for example the cache server 110_2 or the cache server 110_N, holds the relevant content, and may read the content from the cache server holding the relevant content.

FIG. 1 describes a case where one cache server is connected to one SGSN/GGSN apparatus. Note that one cache server may be connected to a plurality of SGSN/GGSN apparatuses, or a plurality of cache servers may be connected to one SGSN/GGSN apparatus.

Furthermore, the distribution server 121 and the cache servers 110_1 to 110_N may be connected.

FIG. 1 has a configuration in which an SGSN apparatus and a GGSN apparatus are integrated in the SGSN/GGSN apparatuses. However, it is also possible to use a configuration in which the SGSN apparatus and the GGSN apparatus are separated. With this, it is possible to use a configuration in which at least one cache server is connected to either the SGSN apparatus or the GGSN apparatus.

The mobile terminal 170 may be a mobile telephone, a smart phone, a tablet, or a PC in which a data communication card in installed, and may be a terminal that can communicate with a mobile 3G network.

In addition, the hit rate calculator 202 may calculate the bit rate using an equation outside of equations (1) and (2).

FIG. 4 is a block diagram illustrating an example of a configuration of the content distribution system in a case of using proxy servers 120_1 to 120_N instead of a cache server. In FIG. 4, since component elements having attached reference symbols similar to FIG. 1 operate similarly to FIG. 1, a description thereof is omitted.

Here, for the proxy server 120_1, two types of mode, transparent and fully transparent, can be considered. In a case where the proxy server 120_1 is transparent, the proxy server 120_1 terminates a message signal from the mobile terminal 170 once, and analyzes the message signal. Content temporarily stored by the proxy server 120_1 is distributed to the mobile terminal 170 from the proxy server 120_1. If necessary, the proxy server 120_1 makes a request to and accesses the distribution server 121 via the SGSN/GGSN apparatus 190_1.

On the other hand, in a case where the proxy server 1201 is fully transparent, the proxy server 120_1 checks a packet header part or the like, using DPI (Deep Packet Inspection) technology, without terminating a signal from the mobile terminal 170, and extracts information such as a URL of the requested content or an IP address of the mobile terminal 170. In a case where the requested content is cached in the proxy server 120_1 the proxy server 120_1, after issuing a distribution stop instruction to the distribution server 121 via the SGSN/GGSN apparatus 190_1, distributes the requested content. It is to be noted that since component elements of the proxy server 120_1 are similar to component elements of the cache server 110_1 of FIG. 2, a detailed description thereof is omitted.

Second Exemplary Embodiment

FIG. 5 is a block diagram illustrating an example of a configuration of the content distribution system according to a second exemplary embodiment. In FIG. 5, component elements having attached reference numbers similar to FIG. 1 operate similarly to FIG. 1, and a description thereof is omitted.

In FIG. 5, N cache servers 410_1 to 410_N are connected to a control apparatus 160. It is to be noted that some cache server(s) of the N cache servers 410_1 to 410_N may be connected to the control apparatus 160.

The cache servers 410_1 to 410_N, a user data apparatus 164 and a policy apparatus 165 are connected to the control apparatus 160. The control apparatus 160 determines the screen resolution of a mobile terminal 170 from connection request information from the mobile terminal, selects a cache server holding the requested content, which is of the relevant screen resolution, and outputs an instruction to the selected cache server.

On receiving an instruction from the control apparatus 160, the respective cache servers read the requested content, which is of the specified screen resolution, and transmit to the mobile terminal 170. The respective cache servers detect temporal changes in bandwidth in wireless segments of a mobile network, and perform distribution following these changes.

Figure 6:
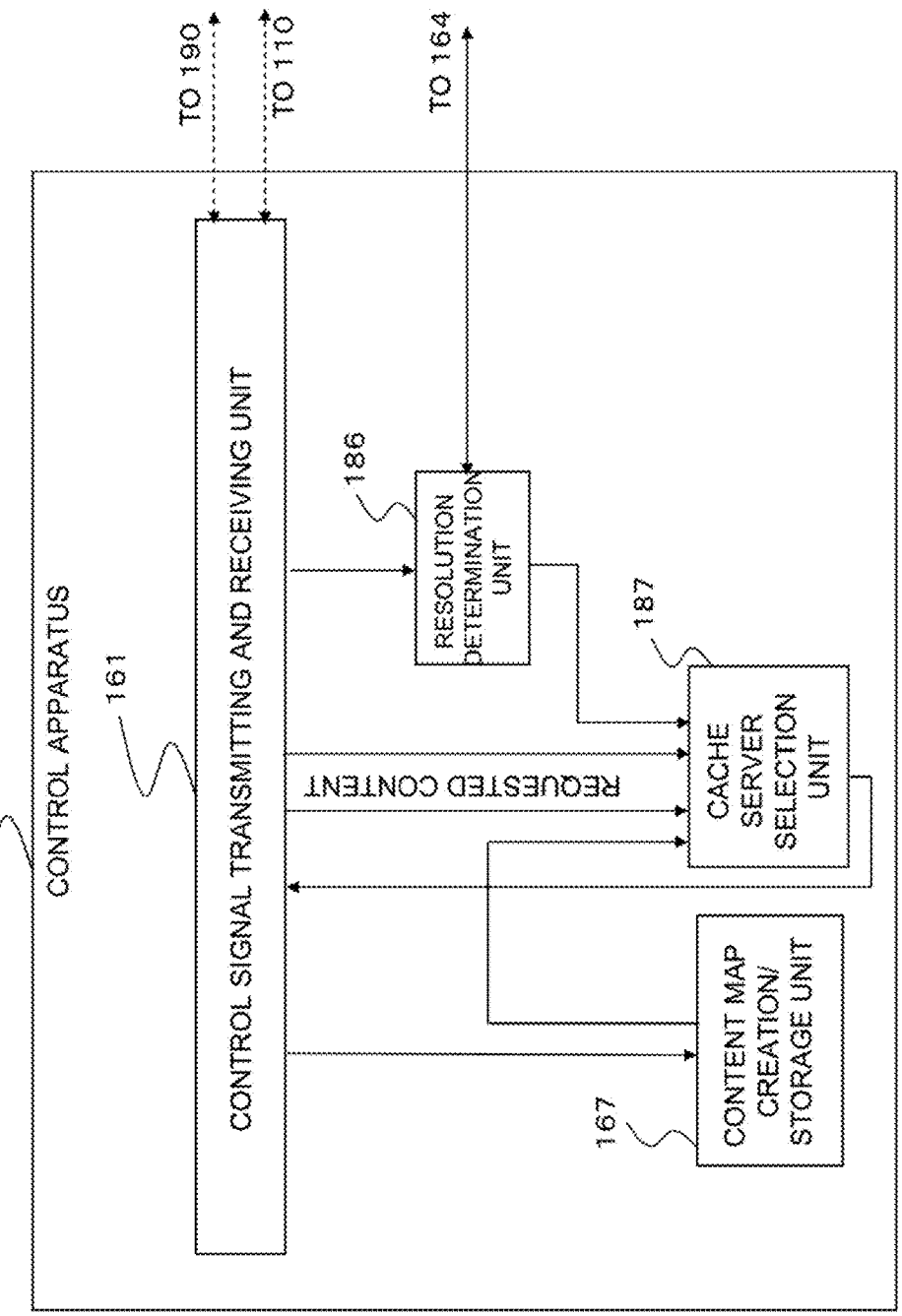
FIG. 6 is a block diagram illustrating an example of a control apparatus in the content distribution system according to the second exemplary embodiment.

FIG. 6 is a block diagram illustrating an example of a configuration of the control apparatus 160. A description is given of a configuration of the control apparatus 160, making reference to FIG. 6. Referring to FIG. 6, the control apparatus 160 is provided with a control signal transmitting and receiving unit 161, a resolution determination unit 186, a cache server selection unit 187, and a content map creation/storage unit 167.

The control signal transmitting and receiving unit 161 extracts terminal information included in a user agent part of connection request information from the mobile terminal 170, and outputs to the resolution determination unit 186. The control signal transmitting and receiving unit 161 outputs the requested content information to the cache server selection unit 187. In addition, the control signal transmitting and receiving unit 161 outputs information concerning whether the mobile terminal 170 is in a service area to the cache server selection unit 187.

The resolution determination unit 186 receives terminal information, obtains relationships between the terminal information and screen resolution from the user data apparatus 164 in which user data is recorded in advance, determines screen resolution information corresponding to the mobile terminal in question, and outputs the screen resolution information to the cache server selection unit 187.

The cache server selection unit 187 receives information concerning whether the mobile terminal 170 is in a service area and requested content information (for example, a URL of the content, etc.) from the control signal transmitting and receiving unit 161, receives screen resolution information for the mobile terminal from the resolution determination unit 186, and receives a content map from the content map creation/storage unit 167. Here, the content map is a map indicating which content is cached by respective cache servers. The cache server selection unit 187 selects a cache server group that caches content of resolution inputted from the resolution determination unit 186, being content requested by the mobile terminal 170, and selects a cache server, giving consideration to information concerning whether the mobile terminal is in a service area and the like. Then the cache server selection unit 187 gives an instruction via the control signal transmitting and receiving unit 161 to the selected cache server to distribute the content requested by the terminal.

The content map creation/storage unit 167 receives a content list from each of the cache servers 410_1 to 410_N, via the control signal transmitting and receiving unit 161, each predetermined time interval, creates a content map representing which content is temporarily stored in which cache server, and stores the created content map.

FIG. 7 is a block diagram illustrating an example of a configuration of the cache server 410_1. It is to be noted that since the other cache servers 410_2 to 410_N have a configuration similar to the cache server 410_1, a description is given only concerning the configuration of the cache server 410_1. Since component elements having attached reference symbols similar to FIG. 2 operate similarly to FIG. 2, a description thereof is omitted.

Referring to FIG. 7, the cache server 410_1 is provided with a control signal transmitting and receiving unit 111, an analysis unit 115, a content securing unit 112, a content temporary storage unit 413, a content list creation unit 116, and a distribution unit 414.

The analysis unit 115 reads what is contained in of the connection request message stored in a payload part, with respect to a GTP packet inputted from the control signal transmitting and receiving unit 111, extracts information of a reception IP address of the mobile terminal 170, a URL of the requested content and the like, and outputs the information to the control apparatus 160 via the control signal transmitting and receiving unit 111. The analysis unit 115 sends information concerning whether the mobile terminal 170 is in a service area to the control apparatus 160. In addition, the analysis unit 115 outputs the URL of the requested content and the like to the distribution unit 414.

The content list creation unit 116 creates a content list every predetermined, time interval, or in a case where a predetermined condition is satisfied, for all content stored in the content temporary storage unit 413 by the cache server in question, and sends the content of the cache server in question to the control apparatus 160, via the control signal transmitting and receiving unit 111.

The distribution unit 414 receives URL information of the requested content from the analysis unit 115, receives screen resolution of the mobile terminal 170 from the cache server selection unit 187 of FIG. 6, searches the content temporary storage unit 413 regarding content of the relevant screen resolution, which is the requested content, and reads the relevant content. The distribution unit 414 creates packets of a predetermined protocol (for example, TCP) with regard to the read content, and sends this to the SGSN/GGSN apparatus 190_1. The SGSN/GGSN apparatus 190_1 distributes packets including the content to the mobile terminal 170.

FIG. 8 is a block diagram illustrating an example of a configuration of the distribution unit 414. Referring to FIG. 8, a description is given concerning a configuration of the distribution unit 414. Here, since component elements having attached reference symbols similar to FIG. 3 operate similarly to FIG. 3, a description thereof is omitted. Referring to FIG. 8, the distribution unit 414 is provided with a transmission unit 300, a receiving unit 201, a hit rate calculator 202 and an acquisition unit 303.

The acquisition unit 303 receives a URL of requested content from the analysis unit 115 of FIG. 7, receives screen resolution from the control signal transmitting and receiving unit 111 of FIG. 6, receives a bit rate B from the bit rate calculator 202 of FIG. 8, and with regard to the requested content, searches the content temporary storage unit 113 of FIG. 6 for a file of bit rate closest to B in a range that does not exceed the bit rate B, having the specified screen resolution, acquires the relevant file or stream, and outputs to the transmission unit 300. It is to be noted that an ECN signal is received by the receiving unit 200, and in a case where a setting of B=0 is set by the bit rate calculator 202, the acquisition unit 303 does not acquire the content but outputs a signal indicating that B=0 to the transmission unit 300.

The transmission unit 300 receives the file or stream of content having the screen resolution specified by the control apparatus 160, which is the content requested by the mobile terminal 170, from the acquisition unit 303. The transmission unit 300 stores the received file or stream in TCP packets for example, to be sent to the SGSN/GGSN apparatus 190_1. The transmission unit 300 notifies information of transmitted packets (for example, packet number, transmission time, transmission bit rate, size, etc.) to the bit rate calculator 202.

In the present exemplary embodiment, various types of modification are possible.

In FIG. 6, the control apparatus 160 receives the mobile network topology and network routing path cost from the policy apparatus 165. However, in a case where this information does not change during operation or is predetermined fixed information, the information may be incorporated as a table in the control apparatus 160.

By connecting cache servers, content may be shared between the cache servers. For example, when the mobile terminal 170 is connected to the cache server 410_1, in a case where the requested content is not cached in the cache server 410_1, the cache server 410_1 may query the control apparatus 160. At this time, the control apparatus 160 may determine whether or not an adjacent cache server, for example the cache server 410_2 or the cache server 410_N, holds the relevant content, and may instruct the cache server 410_1 to read the content from the cache server that holds the relevant content.

FIG. 9 illustrates a configuration in which the cache server of FIG. 5 is replaced by a proxy server. Since the proxy is as described referring to FIG. 4, a description thereof is omitted.

The present exemplary embodiment illustrates an example in which the control apparatus 160 is physically distinct from the cache servers or proxy servers. As another mode, if the control apparatus 160 is logically distinct from the cache servers or proxy servers, it may be installed in the same physical apparatus as these.

Third Exemplary Embodiment

Figure 10:
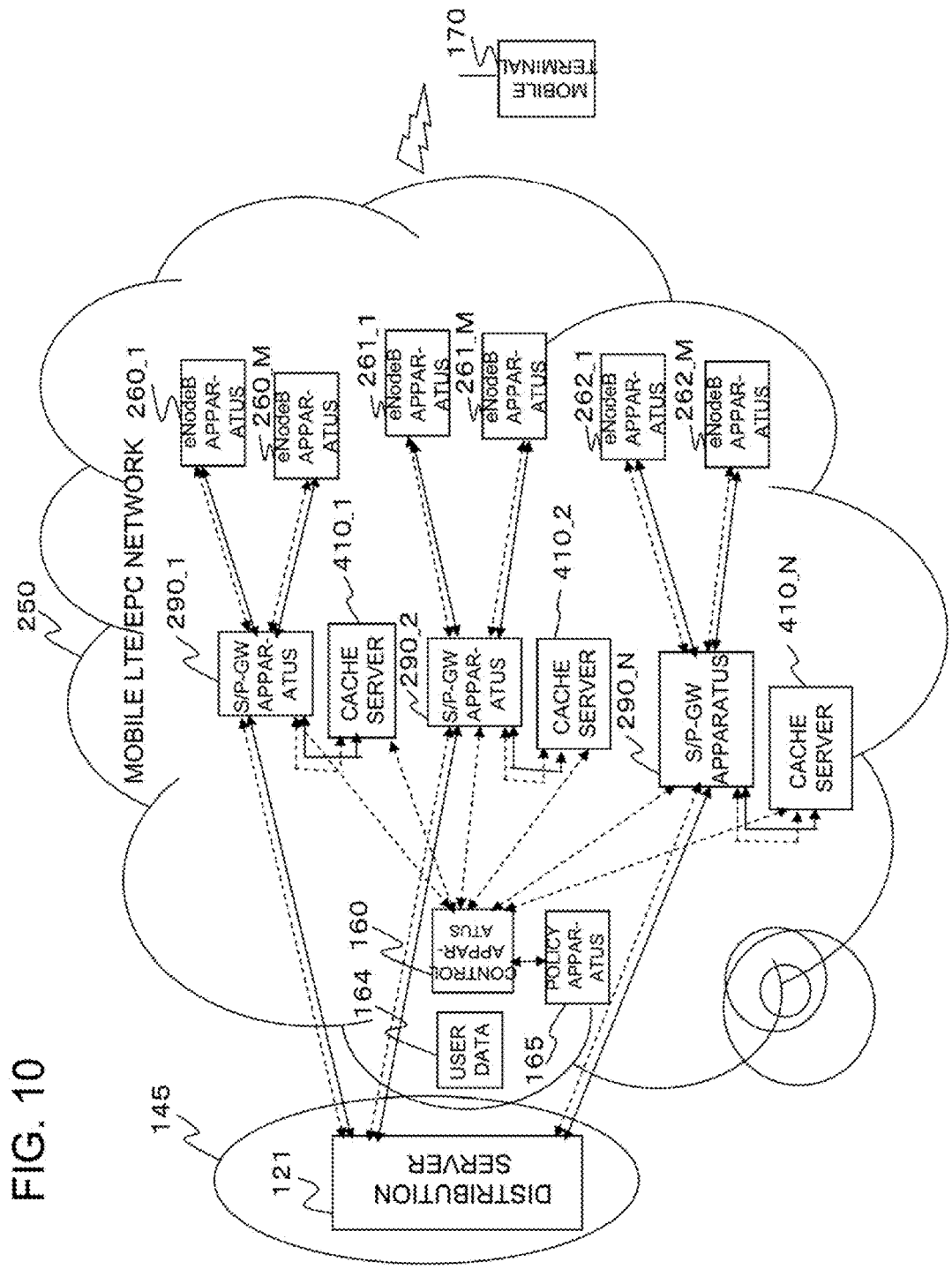
FIG. 10 is a block diagram illustrating an example of a connection configuration of the content distribution system according to a third exemplary embodiment.

Referring to FIG. 10, a description is given concerning the content distribution system according to a third exemplary embodiment. FIG. 10 is a block diagram illustrating an example of a configuration of the content system according to the present exemplary embodiment. FIG. 10 illustrates a configuration using an LTE (Long Term Evolution)/EPC (Evolved Packet Core) network 250, which is a 3.9-th generation mobile network, instead of a 3G mobile network 150 as illustrated in FIG. 5. In LTE, base station and RNC apparatus functions are reduced or removed, to only have eNodeB apparatuses.

In EPC, an S/P-GW (Serving/Packet Data-Gateway) apparatus is connected to eNodeB apparatuses. Here, an S/P-GW apparatus indicates a configuration in which an S-GW apparatus and a P-GW apparatus are integrated. FIG. 10 illustrates a configuration in which M eNodeB apparatuses are connected to one S/P-GW apparatus. For example, the eNodeB apparatuses 260_1 to 260_M are connected to the S/P-GW apparatus 290_1.

Here, one cache server is connected to each S/P-GW apparatus. For example, a cache server 410_1 is connected to the S/P-GW apparatus 290_1.

A mobile terminal 170 issues a connection request message for distribution, with an IP address of a distribution server 120 described. Thereupon, an eNodeB apparatus in whose zone the mobile terminal 170 is present (any of the eNodeB apparatuses 261_1 to 261_M in FIG. 10) receives the connection request message. Any of the eNodeB apparatuses 261_1 to 261_M stores the connection request message, the IP address of the distribution server 120 and the IP address of the mobile terminal 170 in a payload part of a GTP protocol, and forwards a GTP packet to the S/P-GW apparatus 290_2.

A cache server 410_1 has a configuration similar to a configuration shown in FIG. 5. However, in the present exemplary embodiment a connection destination of a control signal transmitting and receiving unit 111 is the S/P-GW apparatus 290_1. Therefore, the control signal transmitting and receiving unit 111 receives the GTP packet storing the connection request message, the IP address and the like from the mobile terminal 170, and location information of the mobile terminal 170 from the S/P-GW apparatus 290_1. It is to be noted that other cache servers 410_2 to 410_N also perform the abovementioned exchange with an S/P-GW apparatus connected to each thereof.

In the present exemplary embodiment, various types of modification are possible.

A control apparatus 160 receives the mobile network topology and network routing path cost from a policy apparatus 165. However, in a case where this information does not change during operation or is predetermined fixed information, the information may be incorporated as a table in the control apparatus 160.

By connecting the cache servers, content may be shared between the cache servers. For example, when the mobile terminal 170 is connected to the cache server 410_1, in a case where the requested content is not cached in the cache server 410_1, the cache server 410_1 may query the control apparatus 160. At this time, the control apparatus 160 may instruct the cache server 410_1 to read content from an adjacent cache server, for example a cache server 410_2 or a cache server 410_N, instead of reading from the distribution server 121.

FIG. 10 describes a case where one cache server is connected to one S/P-GW apparatus. Note that one cache server may be connected to a plurality of S/P-GW apparatuses, or a plurality of cache servers may be connected to one S/P-GW apparatus.

Furthermore, the distribution server 121 and the cache servers 410_1 to 410_N may be connected.

FIG. 10 has a configuration that uses S/P-GW apparatuses in which an S-GW apparatus and a P-GW apparatus are integrated. However, it is also possible to use a configuration in which the S-GW apparatus and the P-GW apparatus are separated. With this, it is possible to use a configuration in which at least one cache server is connected to either the S-GW apparatus or the P-GW apparatus.

The mobile terminal 170 may be a mobile telephone, a smart phone, or a PC in which a data communication card is installed, and may be a terminal that can communicate with a mobile 3.9G network.

Figure 11:
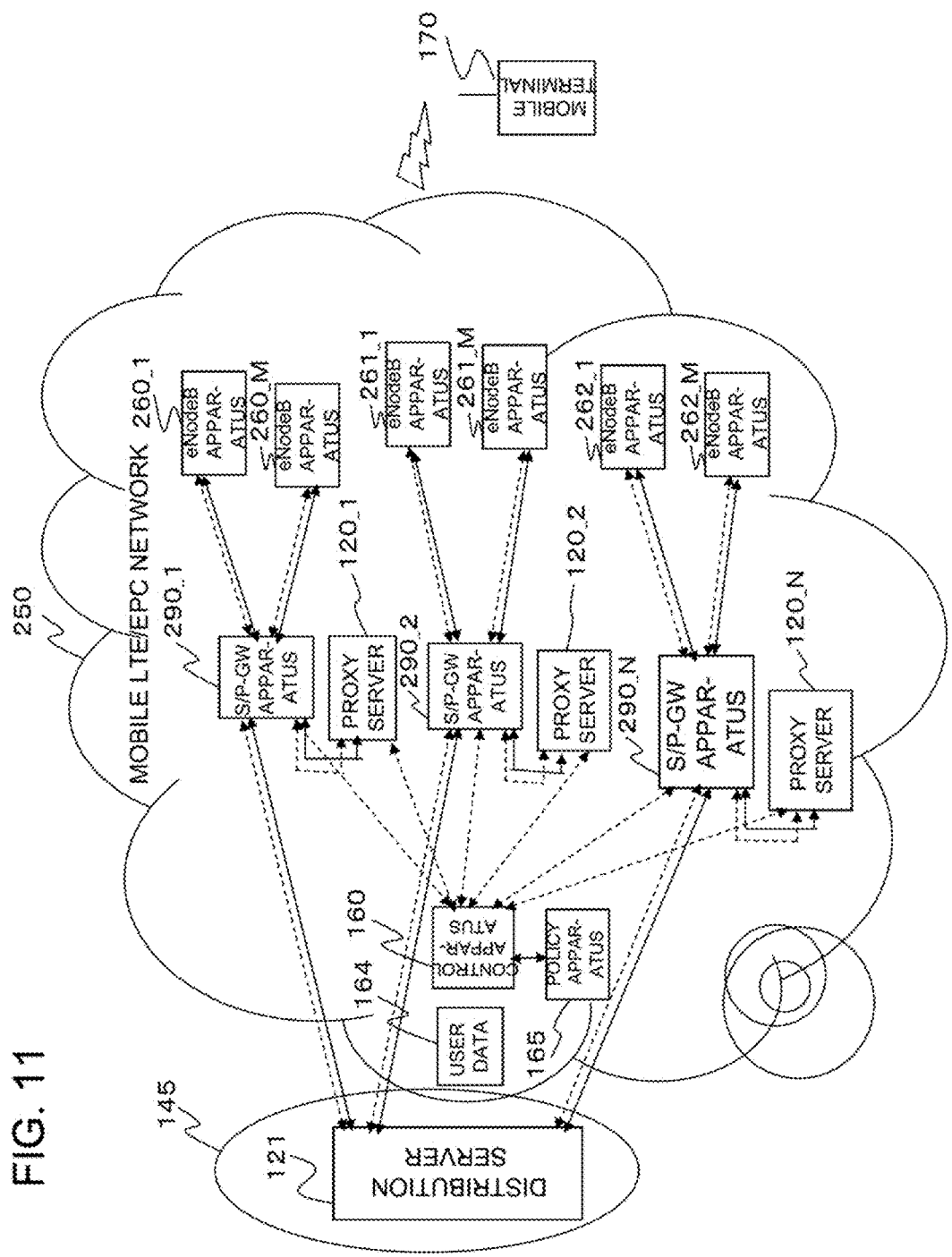
FIG. 11 is a diagram illustrating an example of a connection configuration in a case of using proxy servers in the content distribution system according to the third exemplary embodiment.

FIG. 11 illustrates a configuration in which the cache servers of FIG. 10 are replaced by proxy servers. Since the proxy servers are as described referring to FIG. 4, a description thereof is omitted.

The present exemplary embodiment illustrates an example in which the control apparatus 160 is an apparatus that is physically distinct from the cache servers or proxy servers. As another mode, if the control apparatus 160 is logically distinct from the cache servers or proxy servers, it may be installed in the same physical apparatus as these.

According to the content distribution system of the present invention the following effects are realized.

The distribution unit of the cache server or proxy server calculates a bit rate based on a response signal packet or an FCN (Explicit Congestion Notification) from the terminal, switches to a file or stream of an appropriate bit rate in response to a result of the calculation, and performs output. In this way, even in a case of concentrated access to OTT content, it is possible to avoid congestion in the mobile network without remodeling terminals. Furthermore this effect becomes notable when the number of terminals becomes large and content increases in volume. In addition, from a users viewpoint there is an effect in that delay and packet loss do not occur and problems such as image freezing on a terminal side or speech being interrupted do not occur.

The control apparatus determines terminal-specific screen resolution based on the connection request signal from the terminal, selects a cache server or proxy server holding content of the relevant screen resolution, and outputs an instruction to the relevant cache server or the relevant proxy server. In this way, it is possible to distribute content with a screen resolution appropriate to capability or profile of the terminal, for OTT content.

It is to be noted that the respective disclosures of the conventional technology literature such as the abovementioned patent literature are hereby incorporated by reference into this specification. Modifications and adjustments of exemplary embodiments are possible within the bounds of the entire disclosure (including the scope of the claims) of the present invention, and also based on fundamental technological concepts thereof. Furthermore, multiple combinations and selections of various disclosed elements (including respective elements of the respective claims, respective elements of the respective exemplary embodiments, and respective elements of the respective drawings) are possible within the scope of the claims of the present invention. That is, the present invention clearly includes every type of transformation and modification that a person skilled in the art can realize according to the entire disclosure including the scope of the claims and to technological concepts thereof.

110_1 to 110_N, 410_1 to 410_N cache server
111 control signal transmitting and receiving unit
112 content securing unit
113, 413 content temporary storage unit
114, 414 distribution unit
115 analysis unit
116 content list creation unit
120_1 to 120_N proxy server
121 distribution server
145 Internet
150 mobile network
160 control apparatus
161 control signal transmitting and receiving unit
164 user data
165 policy apparatus
167 content map creation/storage unit
170 mobile terminal
180_1 to 180_M, 181_1 to 181_M, 182_1 to 182_M, 183_1 to 183_M base station
186 resolution determination unit
187 cache server selection unit
190_1 to 190_N SGSN/GGSN apparatus
195_1 to 195_L, 197_1 to 197_L, RNC apparatus
200, 300 transmission unit
201 receiving unit
202 bit rate calculator
203, 303 acquisition unit
250 mobile LTE/EPC network
260_1 to 260_M, 261_1 to 261_M, 262_1 to 262_M eNodeB apparatus
290_1 to 290_N S/P-GW apparatus

What is claimed is:

1. A content distribution system, comprising:
a distribution server that distributes content;
a packet forwarding apparatus that forwards a packet to be sent and received between the distribution server and a user terminal; and
a cache server connected to the packet forwarding apparatus,
wherein the cache server comprises:
a content temporary storage unit that temporarily stores at least some of the content;
a bit rate calculator that calculates a bit rate when the content is sent, based on a TCP (Transmission Control Protocol) response signal received from the user terminal;
an acquisition unit that searches for a file or stream of the content requested in a content request message received from the user terminal, a corresponding bit rate of the file or stream not being greater than the bit rate, from the content temporary storage unit or the distribution server, stores the file or the stream in a packet of a prescribed protocol, and sends the packet; and
a transmission unit that reads the packet from the acquisition unit and sends the packet to the packet forwarding apparatus,
the bit rate calculator measures a packet response time as difference between time at which a prescribed packet is transmitted from the transmission unit and time at which a TCP response signal to the prescribed packet is received from the user terminal, and calculates the bit rate based on the packet response time,
the bit rate is B,
the bit rate calculator calculates the bit rate B according to:

$$B=(1-\alpha) \times Bc + \alpha \times \beta \times (Ta-T), \text{ and}$$

the packet response time is T, a prescribed target response time is Ta, a prescribed convergence factor is $\alpha$, a prescribed conversion factor by which time change is converted to bit rate is $\beta$, and a previous packet transmission bit rate is Bc.

2. The content distribution system according to claim 1, wherein the cache server is one of a plurality of cache servers, the content distribution system further comprises a control apparatus that controls the plurality of cache servers, the control apparatus determines screen resolution of the user terminal based on information included in the content request message received from the user terminal, determines the cache server holding the content of the screen resolution from among the plurality of cache servers, and instructs the cache server to distribute the content, the acquisition unit searches for the file or stream of the content requested in the content request message, having the screen resolution and the corresponding bit rate, from the content temporary storage unit or the distribution server, stores the file or stream in the packet of the prescribed protocol, and the transmission unit reads the packet from the acquisition unit and sends the packet to the packet forwarding apparatus.

3. The content distribution system according to claim 2, wherein the control apparatus extracts an extracted plurality of cache servers that store the content of the screen resolution from among the plurality of cache servers, and selects the cache server from among the extracted plurality of cache servers in accordance with information concerning whether the user terminal is in a service area.

4. The content distribution system according to claim 2, wherein the plurality of cache servers are a transparent or a fully transparent proxy server.

5. The content distribution system according to claim 1, wherein the packet forwarding apparatuses are a SGSN (Serving General packet radio service Support Node) apparatus, a GGSN (Gateway General packet radio service Support Node) apparatus or an SGSN/GGSN apparatus in a mobile packet network, or an S-GW (Serving Gateway) apparatus, a P-GW (Packet data network Gateway) apparatus or an S/P-GW apparatus in a mobile LTE (Long Term Evolution)/EPC (Evolved Packet Core) network.

6. The content distribution system according to claim 1, wherein the content comprises at least one of video, still images, speech, audio, software, applications and data.

7. A cache server connected to a packet forwarding apparatus that forwards a packet to be sent and received between a user terminal and a distribution server that distributes content, the cache server comprising:
- a content temporary storage unit that temporarily stores at least some of the content;
- a bit rate calculator that calculates a bit rate when the content is sent, based on a TCP (Transmission Control Protocol) response signal received from the user terminal;
- an acquisition unit that searches for a file or stream of the content requested in a content request message received from the user terminal, a corresponding bit rate of the file or stream not being greater than the bit rate, from the content temporary storage unit or the distribution server, stores the file or stream in a packet of a prescribed protocol, and sends the packet; and
- a transmission unit that reads the packet from the acquisition unit and sends the packet to the packet forwarding apparatus;

wherein the bit rate calculator measures a packet response time as difference between time at which a prescribed packet is transmitted from the transmission unit and time at which a TCP response signal to the prescribed packet is received from the user terminal, and calculates the bit rate based on the packet response time, the bit rate is B, the bit rate calculator calculates the bit rate B according to:

$$B=(1-\alpha)\times Bc+\alpha\times\beta\times(Ta-T), \text{ and}$$

the packet response time is T, a prescribed target response time is Ta, a prescribed convergence factor is $\alpha$, a prescribed conversion factor by which time change is converted to bit rate is $\beta$, and a previous packet transmission bit rate is Bc.

8. A content distribution method, comprising:

by a cache server connected to a packet forwarding apparatus that forwards a packet to be sent and received between a user terminal and a distribution server that distributes content, temporarily storing at least some of the content in a content temporary storage unit of the cache server;

calculating a bit rate when sending the content based on a TCP (Transmission Control Protocol) response signal received from the user terminal;

searching for a file or stream of the content requested in a content request message received from the user terminal, a corresponding bit rate of the file or stream not being greater than the bit rate, from the content temporary storage unit or the distribution server, storing the file or stream in a packet of a prescribed protocol, and sending the packet, wherein the cache server measures a packet response time as difference between time at which a prescribed packet is transmitted from a transmission unit and time at which a TCP response signal to the prescribed packet is received from the user terminal, and calculates the bit rate based on the packet response time, wherein the bit rate is B, the bit rate B is calculated according to:

$$B=(1-\alpha)\times\beta+a\times\beta\times(Ta-T), \text{ and}$$

the packet response time is T, a prescribed target response time is Ta, a prescribed convergence factor is $\alpha$, a prescribed conversion factor by which time change is converted to bit rate is $\beta$ and a previous packet transmission bit rate is Bc.

9. The content distribution method according to claim 8, wherein the cache server is one of a plurality of cache servers, and the content distribution method further comprises:
- by a control apparatus that controls at least one of a plurality of the cache servers, determining screen resolution of the user terminal, based on information included in the content request message received from the user terminal;
- by the control apparatus, determining the cache server holding the content of the screen resolution from among the plurality of cache servers, and instructing the selected cache server to distribute the content; and
- by the cache server that has received the instruction from the control apparatus among the plurality of cache servers, searching for the file or stream of the content requested in the content request message, having the screen resolution and the corresponding bit rate, from the content temporary storage unit or the distribution server, storing the file or stream in the packet of the prescribed protocol, and sending the packet.

10. The content distribution method according to claim 9, comprising:

by the control apparatus, extracting an extracted plurality of cache servers that store the content of the screen resolution from among the plurality of cache servers, and selecting the cache server from among the extracted plurality of cache servers in accordance with information concerning whether the user terminal is in a service area.

11. The content distribution method according to claim 9, wherein the plurality of cache servers are a transparent or a fully transparent proxy server.

\* \* \* \* \*